Nov. 26, 1940.    N. H. MAGEOCH    2,222,716
MOTOR REDUCER UNIT
Filed Aug. 18, 1939    3 Sheets-Sheet 1

INVENTOR.
NELSON H. MAGEOCH,
BY *Autum Middleton*
ATTORNEY.

INVENTOR
NELSON H. MAGEOCH,
BY Arthur Middleton
ATTORNEY.

Nov. 26, 1940.  N. H. MAGEOCH  2,222,716
MOTOR REDUCER UNIT
Filed Aug. 18, 1939   3 Sheets-Sheet 3
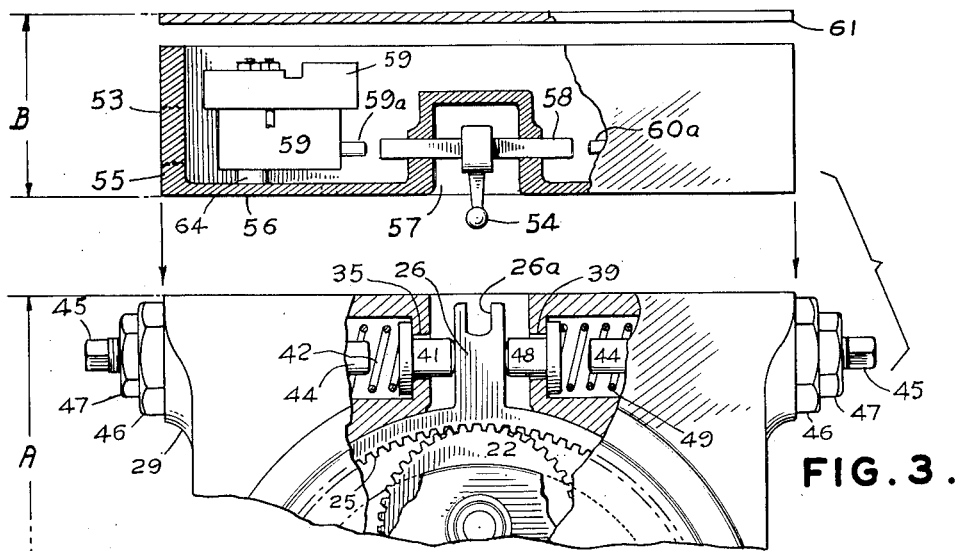
FIG. 3.
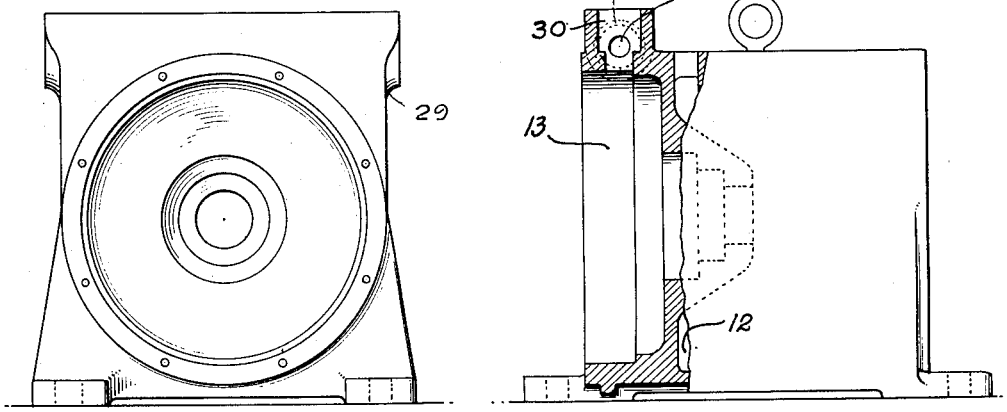
FIG. 4.
FIG. 6.
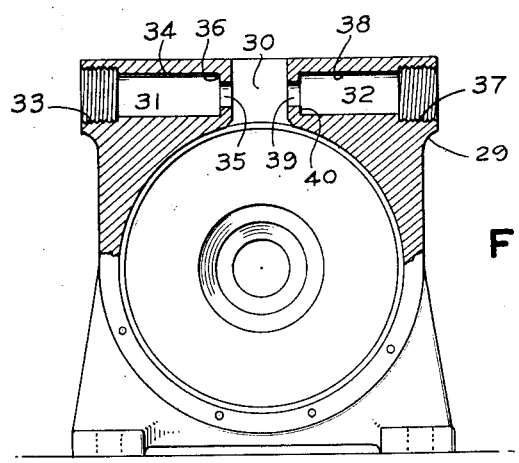
FIG. 5.
INVENTOR.
NELSON H. MAGEOCH,
BY
ATTORNEY.

Patented Nov. 26, 1940

2,222,716

UNITED STATES PATENT OFFICE 2,222,716

MOTOR REDUCER UNIT

Nelson H. Mageoch, Manoa, Pa., assignor to Philadelphia Gear Works, Philadelphia, Pa., a corporation of New Jersey Application August 18, 1939, Serial No. 290,745

6 Claims. (Cl. 74—282)

This invention relates to torque or overload responsive devices in rotary driving mechanism, and more in particular to such devices when used in conjunction with certain types of reduction gearing interposed between a driving and a driven shaft.

More specifically a planetary reduction gear assembly well suited for the embodiment of the invention, is of the type comprising an interiorly toothed ring gear normally stationary, within which operate in epicycloidal fashion a plurality of smaller planetary gears meshing with the ring gear, the planetary gears in turn being driven by a central pinion representing the end of the driving or high-speed or primary shaft element of the assembly. A rotary cage in which each of the planetary gears is in turn rotatably mounted, constitutes the corresponding driven or low-speed or output shaft element of the assembly.

Therefore, this invention may be, and is herein conveniently exemplified by way of the motor reducer assembly or reduction gear motor unit shown in my U. S. Patent No. 1,945,361, in which the motor, together with a planetary reduction gear device of the type defined above, is combined within a unitary cast-iron main housing portion, although separated by a septum integral with that housing.

It is among the objects of this invention to produce an overload responsive mechanism which is compact with respect to the motor gear unit associated therewith, which is simple, rugged, accessible, readily assembled, and direct and positive in operation.

Since the invention must rely upon some manifestation of torque reaction force, it avails itself of the driving force or pressure that is normally absorbed by the ring gear shown to be stationary and fixed in the motor gear housing shown in my above mentioned patent. That is to say, according to the invention, a torque reaction force of predetermined magnitude is caused to manifest itself in the device by allowing the ring gear a limited amount of rotational movement as against the restraining force of suitably adjusted torque resisting spring pressure in a torque balancing device associated with the unit. The amount of rotational movement thus permitted is determined by limits herein defined as the "zero position" and the "abnormal torque position" respectively of the ring gear with respect to the surrounding frame construction or housing member in which the ring gear is thus movable.

According to one feature of the invention the ring gear of a planetary gear assembly such as above defined, has peripheral running fit or equivalent mounting in a stationary housing or casting of the type represented by the motor housing shown in my above mentioned patent. A normal driving force tending to rotate this ring gear from its zero position within the housing, is resisted or balanced by spring pressure adjusted to yield to a torque acting in excess of the resisting spring pressure. Consequently, any such excess torque will cause a slight amount of rotation of the ring gear from its "zero position" to the "excess torque position" at which latter it will actuate a relief or alarm device or switch. If the driving power is thus cut, the torque from the armature shaft of the motor will relax, permitting the resisting spring pressure to return the ring gear to its zero position.

According to another feature a unitary switch assembly or switch box has a downwardly extending switch actuating element or finger adapted to operatively inter-engage with a peripheral portion of the ring gear when the switch box is positioned upon and attached to the motor gear housing, the ring gear normally to be held in zero position by spring means or torque balancing devices provided in the housing.

Still another feature has to do with an article of manufacture in the form of a casting or main housing portion providing various cavities for the reception of the motor, the gear assembly, and the torque resisting or torque balancing devices. This housing portion aside from having an integral septum defining the motor and the gear sections respectively, has a characteristic upward box-like extension at the gear end of the housing and integral therewith, a recess or horizontal bore being provided at each side of this upward box-like extension for the reception of the torque balancing devices, this box-like extension otherwise being adapted to furnish the base for the unitary switch box attachable on top thereof.

According to a preferred embodiment a compact arrangement is adapted to respond to excess torque in either direction. It provides a pair of restraining or torque resisting springs normally balancing each other in the motor gear housing by exerting pressure symmetrically from either side upon a lug extending upwardly as part of the ring gear thus normally to be retained in a neutral or zero position. Upwardly and directly above the restraining springs in the box-like upward extension of the housing, extends the detachable switch box from which in turn a switch actuating finger extends downwardly into operative engagement with the lug of the ring gear. A pair of switches is symmetrically disposed in this attachable switch box so that the actuating member or finger between them will operate either the one or the other of the switches depending upon the direction in which excess torque will make itself felt.

The invention possesses other objects, aspects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings which constitute a part of this specification.

Fig. 3 is a part sectional view upon the gear end of the unit with the switch box in removed position.

Figs. 4 to 6 are diverse views and sections of the main housing portion or casting in the cavities of which motor, reduction gearing, and torque balancing devices are housed, Fig. 4 being a view upon the gear receiving end of the casting; Fig. 5 being a view similar to Fig. 4 with parts broken away to expose the cavities for receiving the torque balancing devices; Fig. 6 being a side view of the casting sectioned to expose the interior of the gear receiving portion.

Fig. 7 is a perspective view of the switch box per se.

Figure 8:
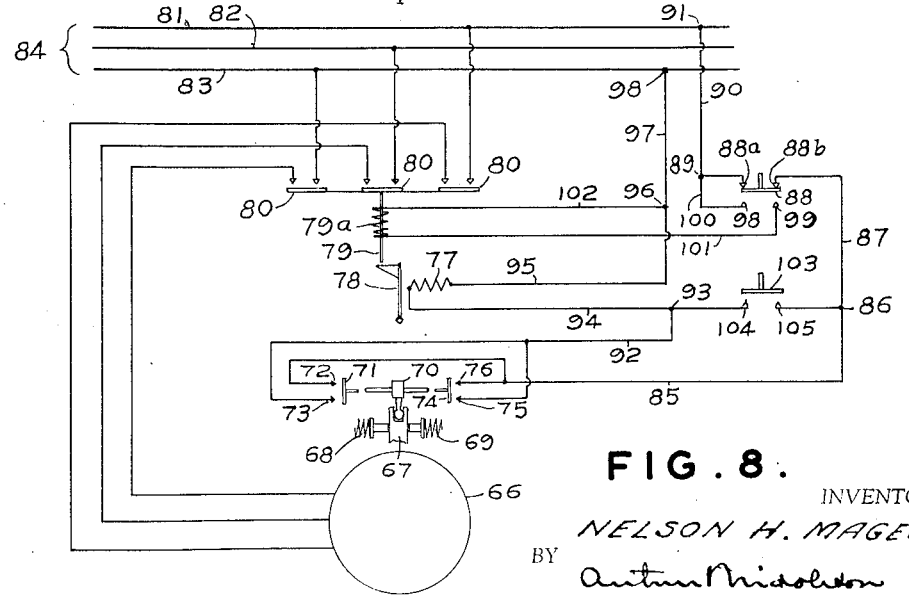

Fig. 8 is a wiring diagram showing the operation of the torque balancing or torque responsive devices with respect to the motor switch in response to excess torque reaction.

The combination herein shown of a motor and reduction gearing assembled in a unitary housing, is the same as that shown in my Patent No. 1,945,361 in which there is featured a main housing portion in the nature of a casting having a septum integral therewith to separate the motor section from the gear section of the unit.

Figure 1:
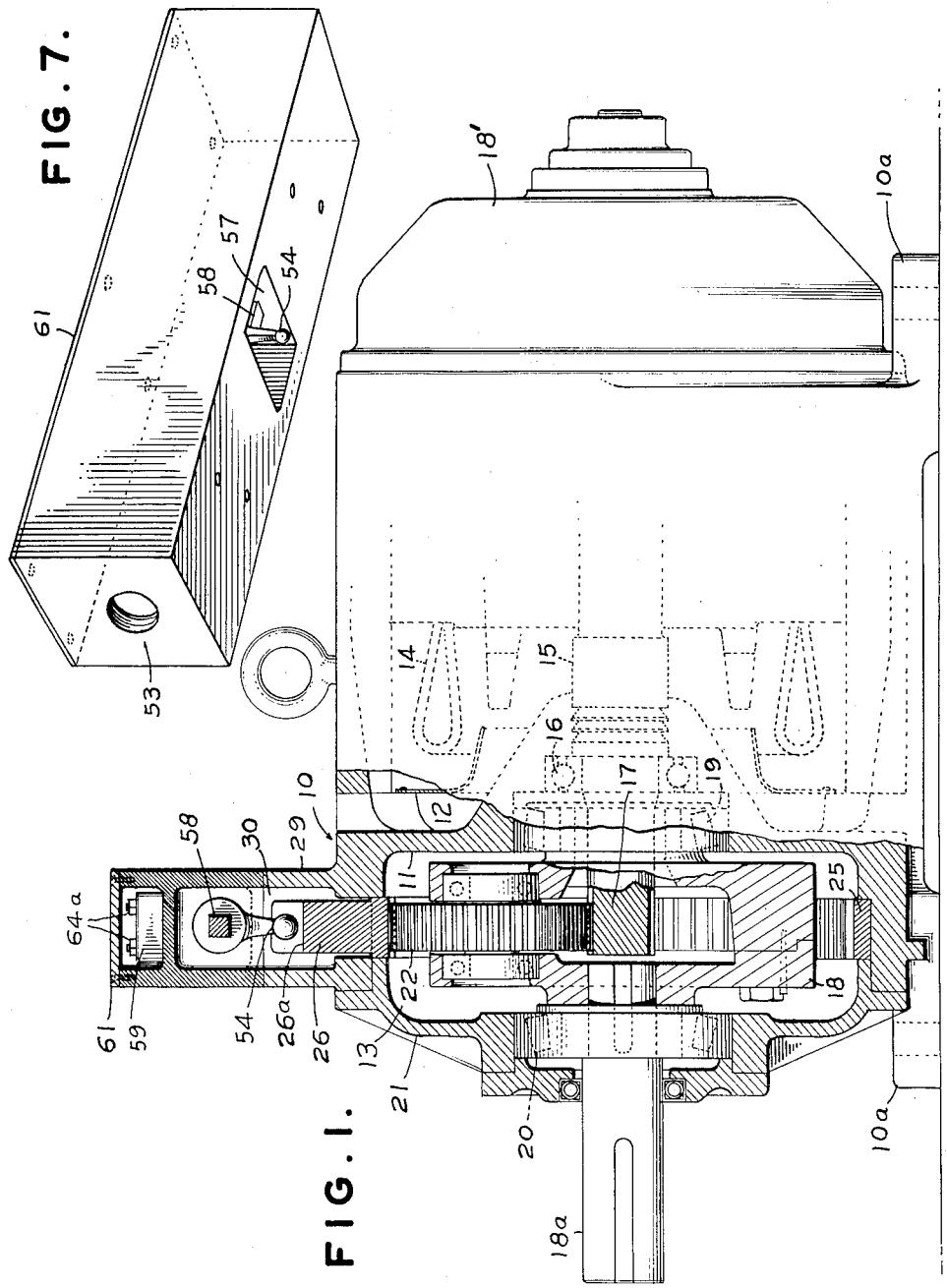
Fig. 1 is a part sectional side view of the motor-reducer unit, showing the interior of the gear section and of the switch box.
Figure 2:
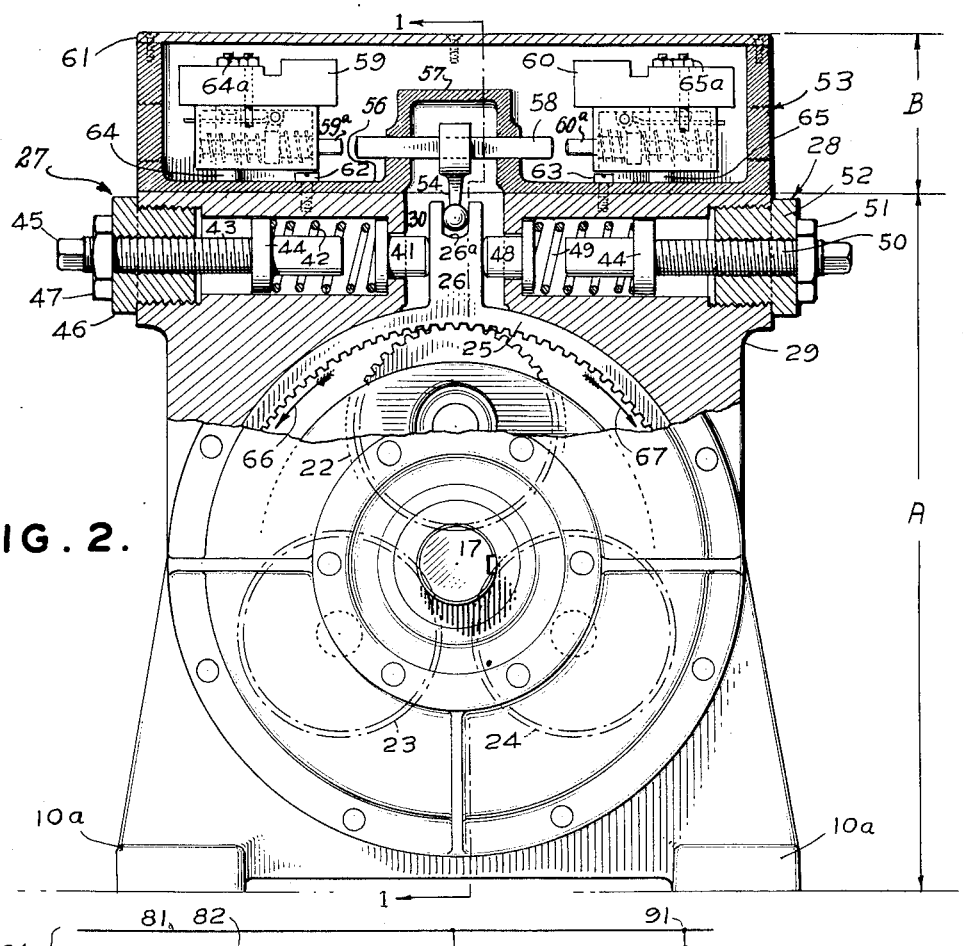
Fig. 2 is a part sectional view upon the gear end of the unit with part of the gearing, the torque balancing devices and the interior of the switch box exposed.

It will thus be understood from Figs. 1 and 2, that there is an open ended main housing portion or body portion or main casting 10 having feet 10a for mounting; and having a transverse partition wall or septum 11 providing in the casting at one end a compartment or section or cavity 12 for the reception of the motor, and at the other end a compartment or section or cavity 13 for the reception of the reduction gearing to be described. The motor is herein indicated (in dot and dash) by motor armature 14 and armature shaft 15 journaled as by roller bearing 16 in the septum 11. The armature shaft 15 constituting the drive shaft or primary shaft passes through the septum into the gearing section 13 where it terminates to form a drive pinion 17 for the reduction gear. The opposite end of the armature shaft 15 is journaled in a housing end portion 18' which closes the motor end of the main housing portion 10. A gear cage 18 has fixedly connected therewith the secondary or output shaft 18a.

The reduction gear in this assembly comprises the rotary gear cage 18 journaled as by conical roller bearing 19 in the septum 11 and by a similar bearing 20 in a housing end portion 21 which closes the gear end of the main housing portion 10. The gear cage 18 has rotatably mounted therein planetary gears 22, 23 and 24 disposed around and meshing with the driving pinion 17 of the armature or primary shaft, and also disposed within and meshing with an internally toothed ring gear 25.

In the aforementioned Patent No. 1,945,361 a similar ring gear is stationary and fixed in the housing, whereas in the present construction it is potentially rotatable or shiftable from a zero position a limited amount in either direction. The ring gear 25 has fixedly connected therewith an outwardly and radially extending, or as herein shown, upwardly extending lug portion 26 normally held in zero position between and by a pair of symmetrically arranged torque balancing or torque responsive devices 27 and 28 such as appear in Fig. 2 at the left and at the right respectively of the lug 26.

In order to accommodate the lug 26 and the torque balancing devices 27 and 28 in the casting 10, the gear end portion of casting 10 is formed with an upwardly-extending boxlike head portion 29 in which there is provided a central vertical passage 30 in which lodges the lug 26. Transversely with respect to the passage 30 (see Fig. 5) there is provided in the head portion 29 of the casting a pair of symmetrically disposed horizontal bores or recesses 31 and 32 respectively (see Fig. 5), which lead from the respective sides of the casting 10 coaxially towards each other and to and into said vertical passage 30. Each of these two horizontal bores comprises a sequence of successively reduced portions, hence the bore 31 comprises (see Fig. 5) an initial outer threaded portion 33, a reduced intermediate portion 34, and a still further reduced inner portion 35 forming a shoulder 36 in the bore. The opposite bore 32 correspondingly comprises successively reduced portions 37, 38 and 39, and at the inner end a shoulder 40.

Referring again to Fig. 2, it will be seen that the torque balancing device 27 in bore 31 comprises a push-buttonlike abutment element 41 seated upon the shoulder 36 in the bore. A compression spring 42 holds the abutment element 41 seated under pressure, the spring being held under adjustable tension by a screw bolt 43 having a shoulder 44 engaged by spring 42. The screw bolt 43 has an exposed outer square head 45 and is screwed into and lengthwise adjustable in a nipple 46 and secured therein by a lock nut 47. The nipple 46 is screwed into the threaded portion 33 of the bore 31. Similarly the opposite torque balancing device 28 comprises a push-buttonlike abutment element 48, a spring 49, a screw bolt 50, with lock nut 51, and a nipple 52.

When the parts including the torque balancing devices 27 and 28 are assembled in the motor gear housing, they will constitute therewith an assembly unit per se, the lug portion 26 of the ring gear being held in its zero position between the spring loaded abutment elements 41 and 48.

A switch box or overload switch device 53 which in turn also represents an assembly unit per se, is attachable to and fits onto the boxlike head portion 29 integral with the housing 10. The switch box has a switch controlling element or finger 54 which extends downwardly with respect to and from the bottom of the switch box, and is adapted to engage in a cutout 26a in the lug portion 26 as and when the switch box 53 is positioned upon and attached to the housing portion 10.

The switch box 53 is herein shown to comprise a rectangular elongated casing 55 adapted to extend transversely of the longitudinal axis of the motor gear housing 10 and has a bottom portion 56 formed with an upwardly and inwardly recessed portion or hollow 57 the walls of which support a horizontally-extending and horizontally-slidable switch control rod 58, the central portion of which has fixed thereon the downwardly-extending switch actuating finger 54.

Referring to Figs. 2 and 3 respectively, a pair of switches 59 and 60 is mounted in respective end sections of the switch box and disposed symmetrically with respect to the switch control rod 58, the switches each having their own actuating member 59a and 60a respectively. When the switch control rod 58 is shifted to the left, it will engage the actuating member 59a and actuate the switch 59. When shifted to the right the switch control rod 58 will engage the actuating member 60a and accordingly actuate the switch 60. The top of the switch box 53 is closed by a cover 61 which may be fastened by screws or in some other suitable manner. The switch box itself (see Fig. 2) is shown to be fastened to the gear motor housing as by means of screws 62 and 63. The switches 59 and 60 are mounted in the switch box upon lugs 64 and 65 respectively by means of screws 64a and 65a respectively.

Referring to Fig. 2, the ring gear 25 when under the influence of excessive torque load in one direction may rotate a short distance in the direction indicated by arrow 66 as the torque balancing pressure of spring 42 is being overcome. This means that the lug 26 of the ring gear shifts the control rod 58 to the left thus actuating the switch 59 effecting cut-off of the motor power, whereupon lug 26 will return to its zero position. Correspondingly when under reverse excess torque the ring gear 25 will shift in the direction of arrow 67, thus causing switch 60 to be actuated to cut the power.

The main housing portion or casting 10 shown in Figs. 4 to 6 represents an article of manufacture which differs from that shown and claimed in my Patent No. 1,945,361 in that its gear end portion is formed with the box-like upward extension 29 to receive therein the torque balancing devices 27 and 28 in cooperative relation with respect to housing body 10 and with the ring gear 25.

Hence, the component sections of this assembly, namely, the motor, reduction gearing, and the two torque balancing devices can be inserted directly into the respective cavities of the casting 10, and the very act of insertion brings the respective component portions directly into the desired cooperative inter-relationship. The resulting unit of assembly is designated as such in Fig. 3 by the letter "A". The switch box 53 represents another unit of assembly which is designated as such by the letter "B" in Fig. 3 where it is shown in position about to be placed upon the assembly unit "A". It will further be seen from Fig. 3 that the act of positioning the assembly unit "B" upon the assembly unit "A" will at once establish cooperative engagement of the switch actuating finger 54 with the lug 26 of ring gear 25.

In the wiring diagram of Fig. 8 the motor gear unit is represented at 66, with the ring gear indicated by lug 67. Springs 68 and 69 at each side of the lug 67 represent the torque balancing devices. The overload switch assembly is represented by an actuator member 70, a switch 71 normally open but operable to close contacts 72 and 73, and a switch 74 which is normally open but operable to close contacts 75 and 76. The closing of either switch 71 or switch 74 will close an auxiliary circuit supplying coil 77, which circuit causes a latch 78 to be withdrawn to allow a relay armature 79 in holding coil 79a to fall, thus opening the motor switch contacts 80 and stopping the motor.

The motor switch contacts 80 are supplied from the three phases 81, 82 and 83 of a power line 84. One pole to the auxiliary circuit controlled by switches 71 and 74 is established by way of conductor 85, point 86, conductor 87, push-button switch 88 normally closing the two contacts 88a and 88b, point 89, conductor 90 terminating at 91 on phase 81 of the power line, the other pole of this auxiliary circuit being established by way of conductor 92, point 93, conductor 94, coil 77, conductor 95, point 96 and conductor 97 terminating at point 98 on the phase 83 of the power line.

In starting the motor the push-button 88 is depressed to close contacts 98 and 99, thus closing a circuit from point 91 on phase 81 of the power line over conductor 90, conductor 100, conductor 101, holding coil 79a, conductor 102, and over point 96 and conductor 97 back to point 98 on phase 83 of the power line.

Another push-button 103 is normally open, but to stop the motor manually it is momentarily depressed to close contacts 104 and 105, thus establishing a circuit to energize coil 77, to cause latch 78 to be withdrawn to allow the relay armature 79 to fall and to open the three phase motor switch contacts 80. This motor stopping circuit is established from point 91 on phase 81 of the power line, over conductor 90, point 89, the normally closed push-button contacts 88a and 88b, conductor 87, point 86, and closed push-button contacts 104 and 105, point 93, conductor 94, coil 77, and back over conductor 95, point 96, and conductor 97 to point 98 on phase 83 of the power line.

Consequently the operation is as follows:

When excessive load is imposed upon the secondary or output shaft 18a (see Figs. 1 and 2), a greater torque is necessary to rotate the planet gears 22, 23 and 24 which are mounted in the rotary gear cage 18. This increased torque imposed upon the planet gears transmits a greater torque to the internal or ring gear 25 which is held in a normal or zero position by lug 26 between springs 42 and 49 of the torque balancing devices. When the torque on the gear ring 25 reaches a pre-determined value, either the left spring 42 or the right spring 49 will be compressed (depending upon the direction of rotation of the output shaft 18a) as the result of excessive torque reaction manifesting itself in a rotational shifting of the ring gear 25. Movement of the lug 26 is transmitted to the switch actuating finger 54 and the switch control rod 58 which latter is moved axially and will actuate one of the respective switches 59 and 60.

Referring to the wiring diagram in Fig. 8, when switch 71 or 74 (depending upon the rotation of direction) is closed, coil 77 will be energized to withdraw the latch 78 to allow the relay armature 79 to fall, thus opening the motor switch contacts 80 and stopping the motor. After the motor has stopped the spring 68 or 69 respectively will return the lug 67 to its normal or zero position.

In starting the motor, the push-button 88 (normally closed upon contacts 88a and 88b) is depressed to close contacts 98 and 99 and consequently to close motor switch contacts 80, until the driven machinery is in motion. While the starting push-button 88 is thus held open, the circuit to the stopping coil 77 is obviously broken so that the initial starting load of the motor will not trip the torque balancing switches 71 and 74 respectively.

To stop the motor manually the push button 103 is momentarily depressed to close contacts 104 and 105, to energize coil 77, to withdraw latch 78, allowing the motor contacts 80 to fall open.

The overload indication received by way of the torque balancing devices 27 or 28 may be utilized in various ways, some of which are: To indicate overload by means of signal lights or alarm system, to indicate rotation by means of lights, to automatically reverse the running direction of the motor reducer unit when the output shaft is retarded or loaded, to regulate the voltage or speed applied to the driving motor, to compensate for variations in the load, to control auxiliary or related devices in processing equipment.

It should be understood that the device herein described is to be considered as responsive to low changes in general, that is to say, to loads above, as well as to those below a given normal load.

It should also be understood that the features relating to the removable switch box and its co-operative association with the torque responsive ring gear 25, are not to be considered as being limited to the construction of the unit herein shown. Positively expressed, it should be understood that these features may be considered in relation to and in combination with a gear casing per se.

The wiring diagram shown in Fig. 8 is an example, since the device according to this invention may also be used in hookups or functional combinations other than the one represented in Fig. 8.

What is claimed is:

1. In a motor-reducer unit as an article of manufacture, a housing body portion in the nature of a substantially cylindrical open ended casting adapted to receive a motor, and reduction gearing comprising an internally toothed ring gear adapted to be rotatably seated in said housing portion and provided with a radially outwardly extending lug portion, said housing portion also adapted to have disposed therein a pair of torque balancing devices co-operatively associated with said lug portion of the ring gear, and also adapted to be associated with a separately mountable overload switch device adapted to co-operate with said lug portion, said housing body portion being formed with an integral portion constituting a lateral extension therefrom of rectangular cross-section, said lateral extension having centrally provided therein a passage leading therethrough from the interior of the housing body portion, which passage is adapted to have lodged therein said lug portion of the gear ring, said lateral extension of the casting furthermore having a pair of symmetrically disposed bores leading substantially coaxially towards each other from the sides of the casting and transversely with respect to the longitudinal axis of the housing body portion and to and into said passage, each of said bores adapted to receive a corresponding torque balancing device to be co-operatively associated with and engaged by said lug portion of the ring gear, said lateral extension of the casting furthermore being adapted to have attached to the top thereof, said overload switch device in a manner to permit the same to enter into operative connection with said lug portion of the ring gear, as and when so attached.

2. A power driven reduction gear device having a primary or high speed shaft, and a secondary or low speed delivery shaft, both shafts substantially in coaxial alignment with one another, and a gear housing in which said shafts are rotatably mounted, said device comprising a driving pinion fixedly associated with said inner end of the armature shaft, a planetary gear cage concentric with and surrounding the inner end portion of said primary shaft, a plurality of planetary gears rotatably mounted in said gear cage and designed to mesh with said driving pinion, an internally toothed normally stationary ring gear concentric with and surrounding said gear cage and having meshing engagement with said planetary gears, said ring gear being rotatably seated in said housing and capable of an amount of potential rotational movement, which movement may occur as a result of driving torque other than the normal and of a force other than a torque balancing force acting upon said ring gear, abutment means limiting potential rotary movement of said ring gear with respect to the housing, a torque balancing device unitary with said housing and comprising adjustable spring means acting upon said gear ring in counter action to the rotative tendency upon the ring gear due to the driving torque, and a self-contained load responsive switch device attachable to said housing in co-operative relationship to said ring gear, and having a switch actuating member adapted to enter into direct co-operative engagement with said ring gear incident to the positioning of said switch device upon said housing and as and when the device is attached thereto, said torque balancing device having its spring pressure adjusted to cause said ring gear and hence said switch actuating member under normal torque and operating conditions to assume a neutral or zero position, and under abnormal load torque conditions to permit it to rotate said ring gear against said spring pressure to an excess torque position to acuate said switch device as a result of load response.

3. A power driven reduction gear device having a gear housing, planetary gearing in the housing comprising an internally toothed normally stationary ring gear rotatably seated in said housing and capable of an amount of rotational movement as a result of driving torque other than the normal and of a force other than a torque balancing force acting upon said ring gear, a torque balancing device unitary with said housing and having spring means to exert pressure upon said ring gear in counter-action to the rotative tendency upon the ring gear due to the driving torque, and a self-contained load-responsive switch device attachable to said housing in cooperative relationship to said ring gear, which switch device comprises a substantially closed casing surrounding the switch proper, the casing having a bottom provided with a recessed portion, and further comprising a finger movable in said recess to actuate said switch, the free end portion of said finger adapted to interengage with said ring gear when the switch device is being attached, said interengagement being in a manner to cause movement of said finger substantially corresponding to the movement of said ring gear.

4. A power driven reduction gear device having a gear housing, planetary gearing in the housing comprising an internally toothed normally stationary ring gear rotatably seated in said housing and capable of an amount of rotational movement as a result of driving torque other than the normal and of a force other than a torque balancing force acting upon said ring gear, a torque balancing device unitary with said housing and having spring means to exert pressure upon said ring gear in counter-action to the rotative tendency upon the ring gear due to the driving torque, and a self-contained load responsive switch device attachable to said housing in cooperative relationship to said ring gear, which switch device comprises a casing surrounding the switch proper, and further comprises a switch actuating member slidably mounted in the casing, and a finger associated with said slidable member and movable to impart sliding movement thereto for actuating the switch, the free end portion of the finger being adapted to interengage with the ring gear in a manner to cause movement of said finger substantially corresponding to the movement of said ring gear.

5. A gear device according to claim 4, in which the casing of the switch device has a bottom portion provided with a recessed portion, said slidable member being slidably mounted by way of its ends in the walls of said recessed portion, so that the intermediate portion of the member extends within said recess, the finger being associated with said intermediate portion of the slidable member and movable in said recess.

6. A gear device according to claim 4 in which the switch actuating member is slidably mounted by way of its ends, and the finger rigidly extends from the intermediate portion of said member.

NELSON H. MAGEOCH.